3,124,579
7-(β-BENZOYLOXY-2-DIISOBUTYLAMINO-PROPYL)-THEOPHYLLINE
Niro Yoshida and Hiroichi Fukuda, Kyoto, Japan, assignors to Nippon Shinyaku Co., Ltd., Kyoto, Japan, a corporation of Japan
No Drawing. Filed Dec. 5, 1960, Ser. No. 73,482
Claims priority, application Japan Dec. 7, 1959
1 Claim. (Cl. 260—256)

This invention relates to new and useful derivatives of theophylline and theobromine and their pharmaceutically acceptable salts as well as to procedures for producing said derivatives.

The theophylline and theobromine derivatives according to the present invention respond to the formula:

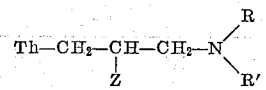

in which Th is selected from the group consisting of 7-theophyllino and 1-theobromino radicals; Z is selected from the group consisting of hydroxyl and acyloxy radicals; and R and R' are selected from the group consisting of hydrogen atoms, the 2-hydroxy-3-(7-theophyllyl)-propyl group, saturated and unsaturated hydroxylated and unhydroxylated phenylated and unphenylated hydrocarbon radicals and, together with the N as a heteroatom, cyclic structure.

Various salts of these bases can be produced in known manner and the salts are those conventionally employed in connection with pharmaceutical agents including quaternary ammonium salts. The derivatives are characterized by containing the 7-theophyllino and 1-theobromino radicals and the derivatives saturated or unsaturated aliphatic, aromatic or alicyclic hydrocarbon radicals which may or may not be hydroxylated and in which a phenyl group may be present or absent. The derivatives may also be cyclic structures wherein the nitrogen atom of the amino or substituted amino group forms the heteroatom of a pyridine, pyrolidine or other cyclic nucleus.

The new derivatives and salts of the present invention have marked coronary vessel dilating action and are useful in medicine as coronary artery dilators and diuretics. The 7-theophylline derivatives have more powerful therapeutic action than the 1-theobromine derivatives and it has further been found that those derivatives containing a tertiary amino radical have more powerful dilating action than the derivatives containing a secondary amine. The N-alkyl groups tend to have a greater coronary dilating action as the number of carbon atoms increases and the N-butyl and N-isobutyl derivatives have been found to be particularly strong coronary artery dilators. In addition, esterification of the hydroxyl groups also tends to bring about a stronger coronary artery dilating action.

Acute toxicity studies (intraperitoneally in the mouse) of the new derivatives of the present invention show that there is some increase in toxicity with an increase in the number of carbon atoms in the N-alkyl group. Derivatives with a branched alkyl chain have lower toxicities than those with a straight chain. The new derivatives had only a slight influence on respiration in a dosage of 10 mg./kg. of body weight in dogs and caused no changes in the electrocardiogram tracings.

Data of the coronary artery dilating actions as expressed by increase of the amount of the coronary blood flow of the novel compounds in the present invention are given below in comparison to those of known analogous substances.

| Compound | Rate of Increase in the Amount of Coronary Blood Flow |
|---|---|
| Known: | |
| Aminophylline | 1 |
| 7-(β-Hydroxypropyl)-theophylline | 0.6 |
| 7-(β,γ-Dihydroxypropyl)-theophylline | 0.2 |
| Novel in the present invention: | |
| 7-(β-Hydroxy-γ-diisobutyl-aminopropyl)-theophylline | 2 |
| 7-(β-Benzoyloxy-γ-diisobutyl-aminopropyl)-theophylline | 3 |
| 7-(β-Acetoxy-γ-diisobutyl-aminopropyl)-theophylline | 3 |
| 7-(β-Benzoyloxy-γ-dibutyl-aminopropyl)-theophylline | 4 |

As shown in the above table, some of the novel compounds in the present invention have much more powerful coronary artery dilating actions than the known analogous substances which have often been applied for such purposes. It is also noted that while aminophylline has an LD$_{50}$ (mg./kg.) of about 270 intraperitoneally in the mouse 7-(β-hydroxy-γ-diisobutylaminopropyl)theophylline and 7-(β-benzoyloxy-γ-diisobutylaminopropyl)theophylline examples of novel compounds of the present invention have the values 1100 and 2000, respectively, showing that they have extremely low toxicities.

As explained in detail above, the novel compounds in the present invention have very prominent pharmacological actions as compared to known analogous substances which have often been used for similar purposes, and, in addition, they have low toxicities so that they are very useful as medicinals. Moreover, the free bases and salts of the novel compounds in the present invention are soluble in water and they may be used in injection.

The new derivatives of the present invention are prepared by any one of the following methods. The first named method is the best and, therefore, preferred.

METHOD 1

7-(β,γ-epoxypropyl)-theophylline or 1-(β,γ-epoxypropyl)theobromine is allowed to react with an amine generally represented by the formula R—NH—R', and the products here obtained are acylated and/or converted into salts, as desired. The reaction scheme is:

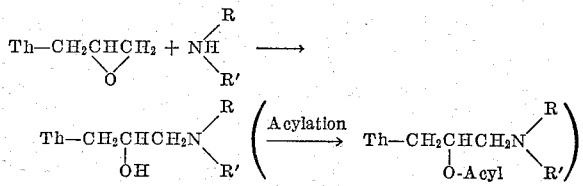

METHOD 2

7 - (β - hydroxy - γ - halogenopropyl)-theophylline or 1-(β-hydroxy-γ-halogenopropyl)-theobromine is allowed to react with an amine generally represented by the formula R—NH—R', and the products obtained are acylated and/or converted into salts, as desired. The reaction scheme is:

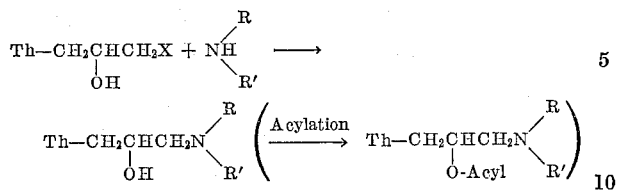

METHOD 3

Theoplylline and theobromine are allowed to react with epoxy compounds of the following general formula:

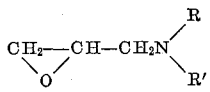

The products obtained and which may be represented by the following formula:

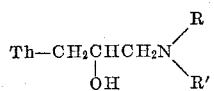

are acylated and/or converted into salts, as desired. In the above formulas, Th, R and R' have the meanings hereinabove set forth.

In carrying out Method 1, it is advantageous to heat the amines in solution or directly with the starting epoxy compounds and for the acylation of the thus produced β-hydroxy compounds, it is preferred to use such acylating agents as acid chlorides and acid anhydrides. Similar procedures are employed in connection with Method 2 and Method 3.

The invention is illustrated in detail by the following non-limitative examples:

*Example I. — 7-(β-Hydroxy-γ-Diisobutylaminopropyl)-Theophylline and the Acyl Derivative*

440 grams of 7-(β,γ-epoxypropyl)-theophylline and 240 grams of diisobutylamine are refluxed in 800 ml. of ethanol for 2.5 hours. The solution is then cooled and the separated crystals filtered off and recrystallized from ethanol to give 442 grams of 7-(β-hydroxy-γ-diisobutylaminopropyl)-theophylline having a melting point of 152° C.

57.5 grams of the above compound is heated with 24 grams of benzoyl chloride in 150 ml. of toluene for 5 hours. The solution is cooled and under ice-cooling extracted with 10% hydrochloric acid. The extract is neutralized under ice-cooling, the separated crystals taken up in chloroform, the chloroform extract evaporated and the residue recrystallized from a small amount of alcohol to give 54 grams of 7-(β-benzoyloxy-γ-diisobutylaminopropyl)-theophylline having a melting point of 101–103° C.

*Example II. — 7-(β-Hydroxy-γ-Dimethylaminopropyl)-Theophylline and the Acyl Derivative*

280 ml. of 22% methanolic solution of dimethylamine and 12 grams of 7-(β,γ-epoxypropyl)-theophylline are allowed to react at 90–92° C. for 12–15 hours. The solvent and excess dimethylamine are then distilled off, the residue treated with a mixture of alcohol and ether (1:9) to remove insoluble mater, and the solution further concentrated. Addition of ether to the residue and cooling separate crystals which are then purified to give 50.5% yield of 7-(β-hydroxy-γ-dimethylaminopropyl)-theophylline having a melting point of 106° C.

*Analysis.*—Calculated for $C_{12}H_{19}O_3N_5$: C, 51.23%, H, 6.81%, N, 24.90%. Found: C, 51.24%, H, 7.11%, N, 24.65%.

Warming this product with methyl iodide in acetone gives the methoiodide of a melting point of 215° C.

On refluxing in benzene with acetyl chloride or acetic anhydride for 4 hours, this product is converted into 7 - (β - acetoxy-γ-dimethylaminopropyl) - theophylline. The melting point of the hydrochloride is 242° C. (decompn.). Similar reaction with benzoyl chloride gives 7 - (β-benzoyloxy-γ-dimethylaminopropyl) - theophylline whose hydrochloride has a melting point of 218° C.

*Example III.—7-(β-Hydroxy-γ-Pyrolidinopropyl)-Theophylline and the Acyl Derivative*

(A) 2.7 grams of 7-(β-hydroxy-γ-chloropropyl)-theophylline and 2 grams of pyrolidine are refluxed for 3 hours in 10 ml. of alcohol, cooled and the separated crystals recrystallized from ethanol to give 2.2 grams of 7-(β-hydroxy-γ-pyrolidinopropyl)-theophylline having a melting point of 141° C.

Reaction of this product with benzoyl chloride gives 7-(β-benzoyloxy-γ-pyrolidinopropyl)-theophylline whose hydrochloride has a melting point of 231–235° C.

(B) 7.2 grams of theophylline and 6 grams of 1-(2,3-epoxypropyl)-pyrolidine are heated in ethanol for 3 hours, cooled and the separated crystals recrystallized from ethanol to give a 57% yield of the identical product, 7-(β-hydroxy-γ-pyrolidinopropyl)-theophylline.

In similar manner, the following 7-theophylline derivatives have been synthesized:

TABLE 1

| R | R' | Z | Melting Point, °C. |
|---|---|---|---|
| Me | H | OH | 176 |
| Et | H | OH | 173–175 |
| HOCH$_2$CH$_2$ | H | OH | 169–170 |
| Et | Et | OH | 90 |
| Et | Et | OBz | [1] 78–80 |
| Pr | H | OH | 141 |
| Bu | H | OH | 139 |
| Pr | Pr | OH | 129 |
| i-Pr | i-Pr | OH | 124 |
| Bu | Bu | OH | 116 |
| i-Pr | i-Pr | OBz | [2] 245 |
| Bu | Bu | OBz | 79 |
| i-Bu | i-Bu | OAc | 117 |
| H | H | OH | 155–156.5 |
| Am | Am | OH | 81 |
| i-Am | i-Am | OH | 93 |
| CH$_2$=CHCH$_2$ | H | OH | 133 |
| CH$_2$=CHCH$_2$ | CH$_2$=CHCH$_2$ | OH | 108–109 |
| PhCH | H | OH | 148 |
| PhCH$_2$CH$_2$ | H | OH | 117 |
| Ph | H | OH | 164 |
| p-MeC$_6$H$_4$ | H | OH | 179 |
| Bu | Bu | OAc | 60–62 |
| Pr | Pr | OAc | 85–86 |
| Pr | Pr | OBz | 91 |
| ThCH$_2$CHCH– <br> \|<br>OH | H | OH | 148–149 |

| R and R' | | Z | Melting Point, °C. |
|---|---|---|---|
| –(CH$_2$)$_5$– | | OH | 136 |
| –(CH$_2$)$_5$– | | OBz | 146–148 |
| –(CH$_2$)$_2$–O–(CH$_2$)$_2$– | | OH | 150–151 |
| –(CH$_2$)$_2$–O–(CH$_2$)$_2$– | | OBz | 160.5 |
| –CO–C—C–CO– <br> ‖ ‖ <br> CH CH <br> \| \| <br> CH=CH | | OH | 335–337 |

[1] Hydrochloride 207–208.
[2] Hydrochloride.

In the above table, Ac stands for acetyl, Bz for benzoyl and Th for 7-theophyllyl, respectively.

*Example IV.—1-(β-Hydroxy-γ-Pyridinopropyl)-Theobromine*

3.5 Grams of pyrolidine and 5 grams of 1-(β-γ-epoxypropyl)-theobromine are heated on a water bath for 2 hours and the resultant mixture is recrystallized from isopropanol or from ethanol to give 5 grams of the compound with the melting point of 138° C.

In similar manner the following 1-theobromino derivatives are obtained:

TABLE 2

| R | R' | Z | Melting Point, °C. |
|---|---|---|---|
| Me | H | OH | 177 |
| Et | H | OH | 182 |
| Pr | H | OH | 134 |
| i-Pr | H | OH | 143 |
| Bu | H | OH | 131 |
| Ph | H | OH | 143 |
| PhCH₂CH₂ | H | OH | 156 |
| R and R' | | | |
| —(CH₂)₅— | | OH | 155 |
| —(CH₂)₅— | | OBz | 92 |
| —(CH₂)₂—O—(CH₂)₂— | | OH | 127 |
| —(CH₂)₂—O—(CH₂)₂— | | OBz | 163.5 |

What is claimed is:

The compound 7 - (β - benzoyloxy-γ-diisobutylaminopropyl)-theophylline.

References Cited in the file of this patent

UNITED STATES PATENTS 2,924,598    Bestian _____ Feb. 9, 1960